US 6,722,485 B1

(12) United States Patent
Gitnes et al.

(10) Patent No.: US 6,722,485 B1
(45) Date of Patent: Apr. 20, 2004

(54) FORCE-LIMITING ROTARY LOCK

(75) Inventors: Seth E. Gitnes, Everett, WA (US);
William H. House, Torrance, CA (US);
Kenneth K. Nakashima, Issaquah, WA (US); Eric A. Polcuch, San Pedro, CA (US)

(73) Assignee: Moog Inc., East Aurora, NY (US)

( * ) Notice: Subject to any disclaimer, the term of this patent is extended or adjusted under 35 U.S.C. 154(b) by 1 day.

(21) Appl. No.: 10/266,710

(22) Filed: Oct. 8, 2002

(51) Int. Cl.[7] .............................. B60T 7/12; B64C 13/00
(52) U.S. Cl. .................. 192/223.1; 74/89.39; 188/82.2; 188/82.7
(58) Field of Search ............................ 192/223.1, 223, 192/141, 150; 188/265, 110, 82.2, 82.7, 82.74, 69, 82.4, 70 R, 70 B; 74/89.37, 89.39; 244/213, 228, 75 R, 231

(56) References Cited

U.S. PATENT DOCUMENTS

| 2,393,120 A | * | 1/1946 | Perman ...................... 188/82.7 |
| 2,854,113 A | * | 9/1958 | Hallden ...................... 192/141 |
| 3,898,817 A | * | 8/1975 | Capewell et al. ......... 192/223.3 |
| 4,459,867 A | * | 7/1984 | Jones ......................... 192/150 |
| 4,579,201 A | * | 4/1986 | Tiedeman .................... 192/150 |
| 4,697,672 A | * | 10/1987 | Linton ........................ 192/223 |
| 5,582,390 A | * | 12/1996 | Russ ........................ 244/75 R |
| 5,655,636 A | * | 8/1997 | Lang et al. .................. 192/223 |
| 6,109,415 A | * | 8/2000 | Morgan et al. ........... 192/223.1 |
| 6,467,363 B2 | * | 10/2002 | Manzanares et al. ...... 74/89.39 |

* cited by examiner

Primary Examiner—Rodney H. Bonck
(74) Attorney, Agent, or Firm—Phillips Lytle LLP

(57) ABSTRACT

A force-limiting rotary lock (20) for a shaft (21) mounted on a housing (22) for rotational and axial movement relative thereto, broadly includes a lug member (28) provided on the shaft, and a pawl (51) mounted on the housing. The pawl is movable relative to the housing between first and second positions. The pawl is operatively arranged to engage the lug when the pawl is in its first position (shown in FIG. 3) to prevent further rotation of the shaft in one angular direction, and to be disengaged from the lug when the pawl is in its second position (shown in FIG. 2) to permit rotation of the shaft in either angular direction. A cam (25) is mounted on the shaft, and a follower (49) is mounted on the housing for selectively moving the pawl between the first and second positions when the shaft is axially displaced from its predetermined position. When the shaft is axially displaced from its predetermined position and the pawl engages the lug, the shaft will be prevented from rotating further in the one angular direction.

4 Claims, 2 Drawing Sheets

FORCE-LIMITING ROTARY LOCK

TECHNICAL FIELD

The present invention relates generally to force limiters, and, more particularly, to an improved force-limiting rotary lock that is particularly adapted to be utilized on an aircraft between a driving shaft and one or more airfoil surfaces, such as flaps, slats and the like.

BACKGROUND ART

In fixed wing aircraft, flaps are used to redefine the contour of the wing during takeoff and landing. In some cases, a ball screw actuator is used to drive a rotary shaft that controls movement of a plurality of individual flaps that are spaced along the wing. It is generally desirable to provide a force limiter to prevent damage to the actuator structure in the event that an overload condition is sensed.

Various types of rotary locking mechanisms are shown and described in U.S. patent application Ser. No. 09/778,600, filed Feb. 7, 2001, (now U.S. Pat. No. 6,467,363) which is assigned to the assignee of the present application, and in U.S. Pat. Nos. 6,109,415, 4,697,672, 4,579,201, 3,898,817 and 5,582,390. The aggregate disclosures of this application and these patents are hereby incorporated by reference.

DISCLOSURE OF THE INVENTION

With parenthetical reference to the corresponding parts, portions or surfaces of the disclosed embodiment, merely for purposes of illustration and not by way of limitation, the present invention provides an improved force-limiting rotary lock (20) for a shaft (21) mounted in a housing (22) for rotational movement about an axis (x-x). The shaft is also axially movable relative to the housing, and is biased (via Belleville spring stacks 33, 34) to move toward a predetermined axial position relative to the housing. The improved rotary lock broadly comprises: at least one member (28) provided on one of the shaft and housing; a pawl (51) mounted on the other of the shaft and housing, the pawl being movable relative to the member (28) between first and second positions: wherein the pawl is operatively arranged to engage the member when the pawl is in the first position (e.g., as shown in FIG. 3) to prevent further rotation of the shaft in one angular direction, and is operatively arranged to be disengaged from the member when the pawl is in the second position (e.g., as shown in FIG. 2) to permit rotation of the shaft in either angular direction; a cam (25) mounted on one of the shaft and housing; a follower (49) associated with the pawl for selectively moving the pawl between the first and second positions, and operatively arranged to engage the cam when the shaft is axially displaced from the predetermined position such that when the shaft is axially displaced from the predetermined position and the pawl (51) engages the member (28), the shaft will be prevented from rotating further in the one angular direction.

In the illustrated embodiment, each member (28) is a lug or dog that extends outwardly from the shaft. However, in an alternative arrangement, such members (be they dogs, lugs or otherwise) could be mounted on the housing.

Also, in the preferred embodiment, the device is shown as having a single pawl (51) which is operatively mounted for selective movement between any one of three spring-biased positions: a first position (e.g., as shown in FIG. 3) in which the pawl (51) engages a member (28) to prevent rotation of the shaft in one angular direction, a second position (e.g., as shown in FIG. 2) in which the pawl is disengaged from such member and permits rotation of the shaft in either angular direction, and a third position in which the pawl engages a member (28) and prevents further rotation in the opposite angular direction. However, in an alternative embodiment, multiple pawls could be provided.

When the shaft is prevented from rotating in one angular direction, the shaft is not prevented from rotating in the opposite angular direction. Moreover, when the shaft is prevented from rotating in the one angular direction, the pawl is retained in its position independently of the axial position of the shaft. When the pawl is in its first or locked position (i.e., to prevent further rotation in the one angular direction), and the shaft is rotated in the opposite angular direction, even when the shaft is not axially displaced, the pawl will be moved from its locked or first position to its unlocked or second position.

Accordingly, the general object of the invention is to provide an improved force-limiting rotary lock.

Another object is to provide a force-limiting rotary lock for use in controlling airfoil surfaces, such as flaps, slats and the like.

These and other objects and advantages will become apparent from the foregoing and ongoing written specification, the drawings, and the appended claims.

DESCRIPTION OF THE PREFERRED EMBODIMENTS

Figure 1:
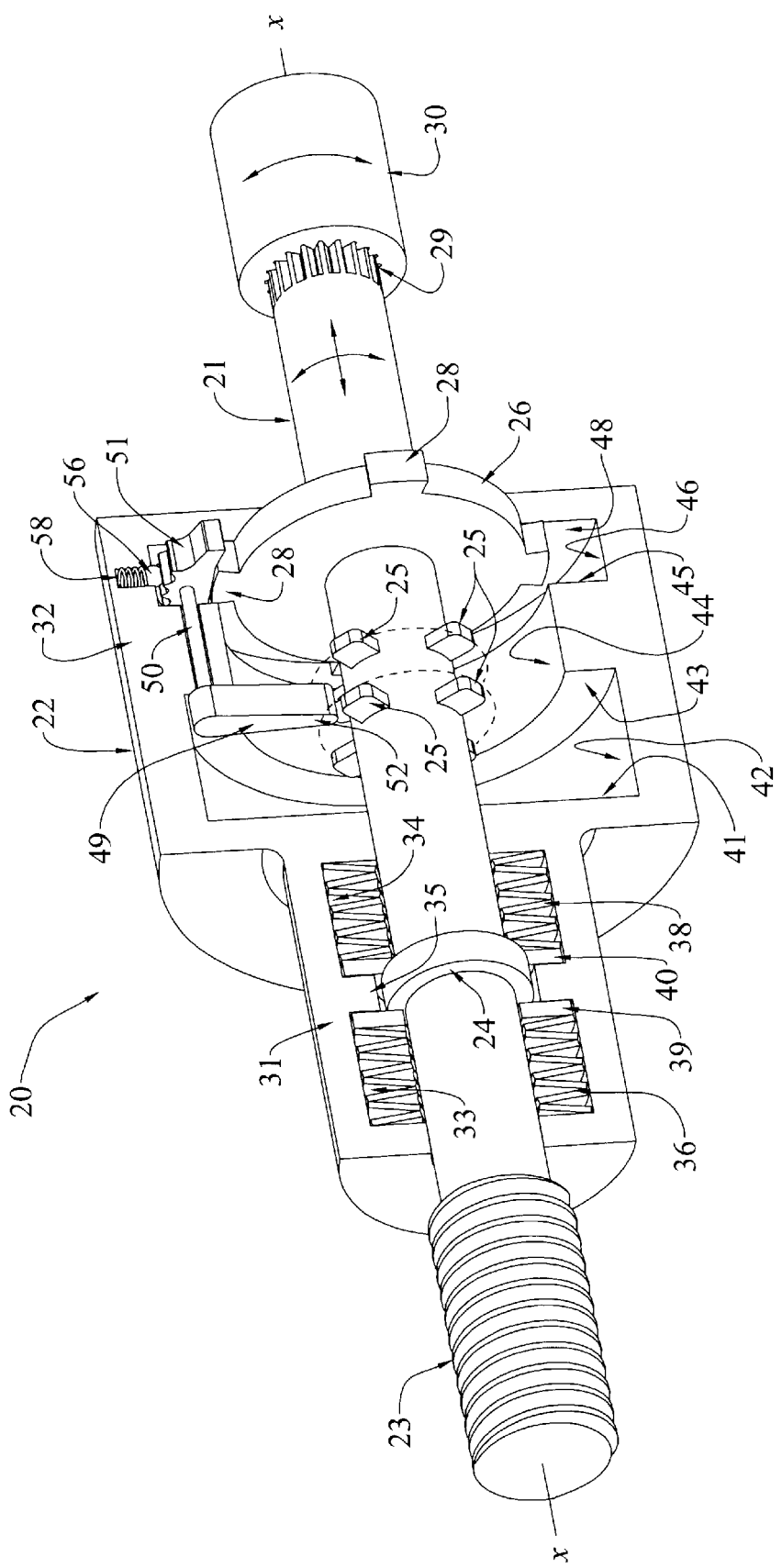
FIG. 1 is a perspective cutaway view of the improved force-limiting rotary lock, this view showing the shaft, the housing, the lug-like members, and the pawl.

At the outset, it should be clearly understood that like reference numerals are intended to identify the same structural elements, portions or surfaces, consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, and, more particularly, to FIG. 1 thereof, the present invention broadly provides an improved force-limiting rotary lock, of which the presently-preferred embodiment is schematically indicated at 20. This embodiment broadly includes a horizontally-elongated shaft, generally indicated at 21, which is operatively mounted within a housing, generally indicated at 22. More particularly, shaft 21 is mounted for both rotational and axial movement relative to the housing.

The shaft is shown as having a generally horizontal axis x-x. The shaft has an external screw thread, schematically indicated at 23, at its left marginal end portion; a collar portion 24 spaced rightwardly from the screw thread; a plurality of cam members, severally indicated at 25, extending outwardly from a portion of the shaft; an annular disk-like member 26 provided with four circumferentially-spaced dog- or lug-like members 28 extending radially outwardly therefrom; and a series of splined teeth 29 operatively engaging a mating set of splined teeth on a driving member 30. Member 30 is arranged to be rotated about axis x-x by a suitable mechanism (not shown). Because of the splined connection, shaft 21 is constrained to rotate with member 30, but is permitted to move axially relative to driving member 30 and housing 22.

Screw thread 23 at the left end of the shaft is operatively connected to a screw-and-nut mechanism (not shown) for driving another member or element (not shown). As long as the reaction force from the screw-and-nut mechanism is less than the preload on Belleville springs 36 or 38 (as described in detail below), there will be no discernable axial movement of the shaft relative to the housing. However, should such driven member lock up for any reason, then continued rotation of shaft 21 will produce a reaction force in excess of the preload, and thus cause axial movement of shaft 21 relative to housing 22.

The housing is shown as being a horizontally-elongated specially-configured tubular member that is penetrated by the shaft. The housing has a leftward portion 31 of reduced diameter, and a rightward portion 32 of enlarged diameter. The housing leftward portion 31 has two axially-spaced chambers 33, 34 separated by an inwardly-extending annular portion 35. A Belleville spring stack 36 is arranged in left chamber 35, and another Belleville spring stack 38 is arranged in right chamber 34. These two Belleville spring stacks act via preload-adjusting shims 39, 40 on shaft collar portion 24, and urge the shaft to move toward a predetermined axial position relative to the housing. Shims 39 and 40 are selected to provide the desired preload on the respective springs, and need not be of the same axial thickness. Indeed, they may be of different axial thicknesses, depending on the particular application.

The housing enlarged-diameter portion 32 is shown as having (from left to right in FIG. 1): a rightwardly-facing annular vertical wall 41, an inwardly-facing horizontal cylindrical wall 42 extending rightwardly therefrom, a leftwardly-facing annular vertical surface 43, an inwardly-facing horizontal cylindrical surface 44, a rightwardly-facing annular vertical surface 45, an inwardly-facing horizontal cylindrical surface 46, and an leftwardly-facing annular vertical surface 48. The cam members 25 are arranged in two axially-spaced groups of four each, with the cam members of each group being spaced equidistantly about the shaft axis by intervals of about 90 degrees. Thus, there are a total of eight cam members 25, and these extend outwardly so as to face toward housing surface 44. Disk member 26 is arranged in the housing recess defined between surfaces 45, 46 and 48. As previously indicated, member 26 is an annular disk-like member from which four lug-like members 28 extend radially outwardly. These four members are spaced equidistantly about the outer cylindrical surface of disk member 26.

Cam follower 49 is mounted on the left marginal end portion of a rod 50 that is pivotally mounted in a hole that extends between housing surfaces 43 and 45. Follower 49 is mounted on one end of rod 50, and a pawl 51 is mounted on the other end of this rod. Follower 49 has a inner portion 52 that is normally arranged to be axially positioned between the axially-spaced cams 25, 25. Thus, when the shaft is in its predetermined axial position relative to the housing and driving member 30 is rotated, shaft 21 will rotate and will cause the desired movement of the flap. In other words, during normal operation, the shaft will rotate in response to an input from driving member 30, but will not move axially relative to the housing.

However, in the event that the flap drive becomes jammed, such impeded movement of the drive will be transmitted back through screw thread 23 and will cause axial shifting of shaft 21. As this occurs, the inner end of follower 49 will be engaged by one of the cams 25. Continued rotation of the shaft will cause follower 49 to pivot about the axis of rod 50, and will cause pawl 51 to move from its second or unlocked position (as shown in FIG. 2) to its first or biased locked position (as shown in FIG. 3).

Figure 3:
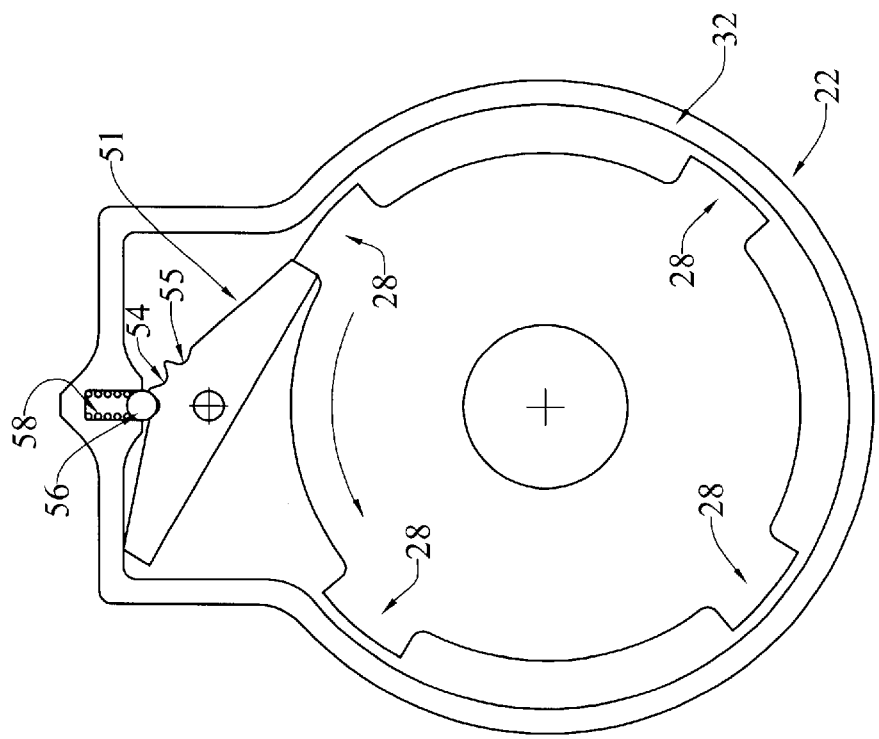
FIG. 3 is a view generally similar to FIG. 2, but showing the pawl as having been moved from its unlocked or second position to its first or locked position, and further showing the pawl as operatively engaging one of the lug-like members to prevent further rotation of the shaft in a counter-clockwise direction.
Figure 2:
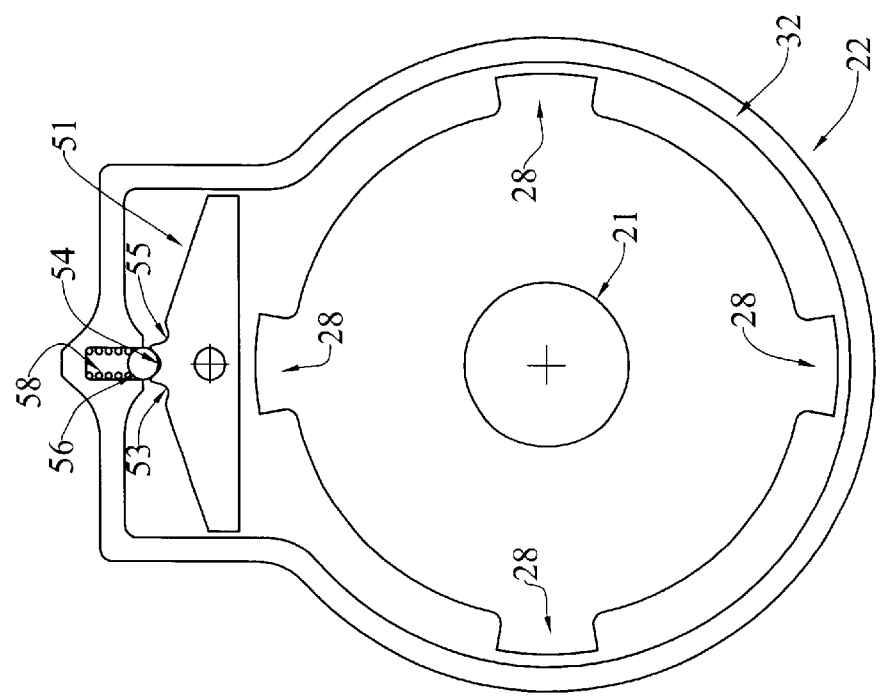
FIG. 2 is a fragmentary vertical sectional view of FIG. 1, showing the pawl as being in its disengaged or second position.

As best shown in FIGS. 2 and 3, the pawl is a specially-configured member having three concave recesses 53, 54 and 55, respectively. A ball 56 is mounted on the housing and is biased by a spring 58 to move toward the pawl and to snap into one of recesses 53, 54 or 55.

When the shaft is in its predetermined axial position relative to the housing, normal rotational movement of the shaft does not cause any movement of pawl 51. Thus, the pawl is normally retained in its unlocked or second position, as shown in FIG. 2. However, should the shaft move in either axial direction, as by a flap being overloaded or locked up and the threaded connection causing axial shifting of the shaft within the housing, follower 49 will engage the cams 25 on the axially-shifted shaft and will pivot the pawl from its unlocked position (shown in FIG. 2) to its alternative locked position (shown in FIG. 3). In this condition, the locked position of the pawl will preclude further rotation of the shaft in the same direction by blocking one of the lugs 28 on disk 26, this being shown as being counter-clockwise in FIG. 3.

However, even when locked against further rotation in one angular direction, the shaft is free to rotate in the opposite (i.e., clockwise) angular direction. As this occurs, the advancing lug will then engage the off-center pawl and return it from its locked position back to its normal position.

It should be noted that the design shown in FIGS. 1–3 is capable of locking the shaft against further rotation in the event of a overload, in either angular direction, with the shaft in all cases being free to be moved in opposite angular direction so as to selectively unlock the mechanism.

Thus, the invention provides an improved force-limiting rotary lock for a shaft mounted on a housing.

Modifications

As indicated above, many changes and modifications may be made. For example, the form illustrated in the drawings is intended to be viewed as a schematic. The actual implementation of this schematic may take varied and other forms. While it is presently preferred to use opposed Belleville spring stacks with preload-adjusting shims, other types of centering devices may be used. Similarly, other types of cams and followers may be used. The pawl may be mounted on either the shaft or the housing, with the lugs being mounted on the other of the shaft and housing. Connections other than the splined connection may be substituted therefor.

Therefore, while the presently preferred form of the improved force-limiting rotary lock has been shown and described, and certain changes and modifications thereof discussed, persons skilled in this art will readily appreciate that various additional changes and modifications may be made without departing from the spirit of the invention, as defined and differentiated by the following claims.

What is claimed is:

1. A rotary lock for a shaft mounted in a housing for rotational movement about an axis, said shaft being axially movable relative to said housing and being biased to move toward a predetermined axial position, comprising:

at least one member provided on one of said shaft and housing;

a pawl mounted on the other of said shaft and housing, said pawl being movable relative to said other of said shaft and housing between first and second positions;

wherein said pawl is operatively arranged to engage said member when said pawl is in said first position to prevent further rotation of said shaft in one angular direction, and to be disengaged from said member when said pawl is in said second position to permit rotation of said shaft in either angular direction;

a cam mounted on one of said shaft and housing;

a follower operatively arranged to engage said cam as said shaft is rotated when said shaft is axially displaced from said predetermined position to selectively move said pawl between said first and second positions and;

such that when said shaft is axially displaced from said predetermined position and said pawl engages said member, said shaft will be prevented from rotating further in said one angular direction.

2. A rotary lock as set forth in claim 1 wherein, when said shaft is prevented from rotating in said one angular direction, said shaft is not prevented from rotating in the opposite angular direction.

3. A rotary lock as set forth in claim 2 wherein, when said shaft is prevented from rotating in said one angular direction, said pawl is retained in said first position independently of the axial position of said shaft.

4. A rotary lock as set forth in claim 2 wherein, as said shaft is rotated in said opposite angular direction and said shaft is not axially displaced, said pawl will be moved from said first position to said second position.

* * * * *